United States Patent [19]
Fehlner et al.

[11] Patent Number: 5,618,435
[45] Date of Patent: *Apr. 8, 1997

[54] SYNTHESIS OF INORGANIC MEMBRANES INCLUDING METALS

[75] Inventors: James R. Fehlner, Salem Township, Wayne County, Pa.; Zhenyu Zhang, New York, N.Y.

[73] Assignee: Inrad, Northvale, N.J.

[*] Notice: The term of this patent shall not extend beyond the expiration date of Pat. No. 5,474,681.

[21] Appl. No.: 474,836

[22] Filed: Jun. 7, 1995

Related U.S. Application Data

[63] Continuation-in-part of Ser. No. 864,814, Mar. 31, 1992, Pat. No. 5,474,681.

[51] Int. Cl.$^6$ ..................................................... B01D 71/02
[52] U.S. Cl. ..................... 210/651; 210/502.1; 427/245
[58] Field of Search .............................. 210/500.25, 490, 210/502.1, 510.1, 496, 500.26, 651, 652; 502/4; 427/244, 245, 246

[56] References Cited

U.S. PATENT DOCUMENTS

| | | |
|---|---|---|
| 4,499,149 | 2/1985 | Berger . |
| 4,740,219 | 4/1988 | Kulprathipanja et al. . |
| 4,828,588 | 5/1989 | Hwang et al. . |
| 5,019,263 | 5/1991 | Haag et al. . |
| 5,069,794 | 12/1991 | Haag et al. ............................. 210/650 |
| 5,110,972 | 5/1992 | Greenlee . |
| 5,474,681 | 12/1995 | Fehlner et al. ...................... 210/500.25 |

FOREIGN PATENT DOCUMENTS

| | | |
|---|---|---|
| 1235684 | 4/1988 | Canada . |
| 481658 | 4/1992 | European Pat. Off. . |
| 481659 | 4/1992 | European Pat. Off. . |
| 481660 | 4/1992 | European Pat. Off. . |

OTHER PUBLICATIONS

Geus, E.R., van Bekkum, H., Bakker, W.J.W. and Moulijn, *Microporous Materials*, 1, 131–47 (1993).

Sano, T., Mizukami, F., Takaya, H., Mouri, T., and ?, M., *Bull. Chem. Soc. Japan*, 65, 146–54 (1992).

Sano, T., Kiyozumi, Y., Maeda, K., Toba, M., Niwa, S. and Mizukami, F., *J. Mater. Chem.*, 2, 141–2 (1992).

Sano, T., Hasegawa, M., Kawakami, Y., Kiyozumi, Y., Yanagishita, H., Kitamoto, D. and Mizukami, F., *Zeolites and Related Microporous Materials: State of the Art 1994*, Eds., Weitkamp, J., Karge, H.G., Pfeifer and Holderich, W., Elsevier Science, 1175–82 (1994).

Herreros, B. and Klinowski, J., *Chem. Phys. Letters*, 220, 478–80 (1994).

Noack, M., Kolsch, P., Venzka, E., Toussaint, P. and Caro, J., *Microporous Materials*, 3, 201–6 (1994).

Tsikoyiannis, J.G. and Haag, W., O., *Zeolites*, 12, 126–30 (1992).

Anderson, M. W., Pachis, K.S., Shi, J. and Carr, S.W., *J. Mater. Chem.*, 2, 255–6 (1992).

Jansen, J.C., Nugroho, W. and van Bekkum, H., *Proceedings of the Ninth International Zeolite Conference, Montreal*, Eds., van Ballmoos, et al., Butterworth–Heinmann, Boston, 247–54 (1992).

(List continued on next page.)

*Primary Examiner*—Frank Spear
*Attorney, Agent, or Firm*—Stroock & Stroock & Lavan

[57] ABSTRACT

Inorganic membranes such as zeolite membranes or other molecular sieve membranes can be provided by using silicone, polymer material as starting material. A thin film zeolite membrane or a thin film membrane formed of interlocking zeolite crystals can be provided. Water soluble or water insoluble silicones can be treated in a basic solution under conditions and with an appropriate structure directing template, suitable aluminum content and at a temperature that is appropriate for growing a desired inorganic crystal framework. Heteroatoms can be included in the crystalline framework.

48 Claims, 2 Drawing Sheets

OTHER PUBLICATIONS

Geus, E. R., den Exter, M.J. and van Bekkum, H., *J. Chem. Sci Faraday Trans.*, 88, 3101–9 (1992).

Zeolites in Catalysis and Adsorption, D.E.W. Vaughan, *Chemical Engineering Progress,* Feb., 1988, pp. 25–31.

Hayhurst, D.T. and Lee, J.C., Parameters Affecting the Growth of Large Silicalite Crystals, 7th Int'l Zeolite Conference (1986).

Inorganic Membranes for Advanced Separations, 1991 Technology and Business Review.

CAS Search Report directed to Zeolite Membranes.

Sano, T. et al., Preparation and Characterization of ZSM–5 Zeolite Film, "Zeolites", Nov., Dec. 1991, pp. 842–845.

Rolison, Debra R., Ishikawa et al., Zeolite–Modified Electrodes and Electrode–Modified Zeolites, *Chemical Reviews,* vol. 90 (1990), pp. 867–878.

Ishikawa, Akira et al., Separation of Water–Alcohol Mixtures by Permeation Through a Zeolite Membrane on Porous Glass, *J. Chem. Soc.,* Chem. Commun. (1989), pp. 764–765.

SYNTHESIS OF INORGANIC MEMBRANES INCLUDING METALS

CROSS REFERENCE TO RELATED APPLICATION

This application is a Continuation-in-Part of U.S. Ser. No. 07/864,814 filed Mar. 31, 1992, entitled SYNTHESIS OF INORGANIC MEMBRANES, now U.S. Pat. No. 5,474,681.

BACKGROUND OF THE INVENTION

The invention relates generally to inorganic membranes such as thin layers, films and coatings of zeolite material and more particularly to inorganic membranes that include cations in the zeolite pore structure.

Zeolites are crystalline aluminosilicates, containing molecular sized pores. They are an important material for catalyzing reactions, and are commonly used in the catalytic cracking of petroleum and other reactions of hydrocarbons. For example, ZSM-5 zeolites have an MFI framework with intersecting pores having a diameter of 5 to 6 Å. Zeolites are commonly provided in a powder form and are used to selectively crack straight chain molecules over branched chain molecules. In addition, zeolite particles have been used to selectively form para-xylene, which is used to make terephthalic acid for various polymerization reactions and in the synthesis or rearrangement of xylenes.

Zeolites are formed with a three dimensional structure in which the tetrahedra of primarily $SiO_4$ and $AlO_4$ are crosslinked by sharing oxygen atoms, whereby the ratio of Si to O atoms is 1:2. Depending on the manner of bonding, the crystal structures can have various ring sizes containing 8, 10 or 12 metal/semimetal atoms. This presence of rings provides a crystal structure with pores and chambers that are of molecular size. The presence of these chambers promotes the separation of molecules according to their size and their affinity to the zeolitic surface. Because zeolites are commonly available in the form of fine powders, catalytic systems including zeolites frequently use packed or fluidized beds made of zeolite crystal powders or small pellets made up of zeolite crystals. The reactants are fed through the bed, generally at relatively high temperatures, and the products are collected at the other end. However, it is very possible for molecules to pass through the bed without ever entering a zeolite pore. Thus, a significant portion of the reactants will pass through the bed and remain unreacted. Furthermore, the small size of the materials make it difficult to handle.

Various attempts have been made to overcome these problems. For example, U.S. Pat. No. 4,740,219, the contents of which are incorporated herein by reference, discusses composite membranes of zeolite particles on organic membranes. Unfortunately, such membranes were not fully suitable and for example, lack sufficient temperature stability. U.S. Pat. Nos. 5,019,263 and 5,069,794 report the formation of membranes formed with layers of zeolitic material. The contents of these two patents are incorporated herein by reference. Sano, et al., *Bull Chem. Soc. Jpn.* 65:146 (1992) and Sano, et al., *Zeolites*, 11:842 (1991) discuss forming layers of zeolite material. See, also the methods discussed in U.S. Pat. No. 4,740,219 Canadian Patent No. 1,235,684, Ishikawa, A., *J. Chem. Soc., Chem. Commun.*, 764 (1989), the contents of which are incorporated herein by reference. However, the methods discussed therein for forming zeolite membranes are not fully satisfactory. Moreover, neither of these patents nor these articles discuss reliable ways of forming catalytic centers by incorporating cations within the zeolite pore structure. Providing zeolite membranes in which cations are present within the pore structure is important for conducting various important chemical reactions.

Accordingly, it is desirable to provide zeolite in a more suitable form to overcome the shortcomings of the prior art.

SUMMARY OF THE INVENTION

Generally speaking, in accordance with the invention, inorganic membranes such as those including molecular sieve material can be produced by heating silicone polymer material under aqueous basic conditions, in the presence of a structure determining template material. By controlling the reaction conditions, zeolitic membranes can be formed, such as in the form of a continuous thin film zeolite membrane or a thin film membrane formed of interlocking zeolitic crystals. The solution is then heated from 90° to 300° C. preferably 90° to 250° C. and still more preferably 100° to 200° C. for over four hours. By including heteroatoms within the reaction solution, cations can be provided within the zeolite pores.

Accordingly, it is an object of the invention to provide an improved method of forming inorganic membranes.

Another object of the invention is to provide improved membranes including crystalline molecular sieve material.

Yet another object of the invention is to provide an improved method for changing the composition of fluids.

Still other objects and advantages of the invention will in part be obvious and will in part be apparent from the specification.

The invention accordingly comprises the several steps in the relation of one or more of such steps with respect to each of the others, and the membrane possessing the features, properties, and relation of elements, which are exemplified in the following detailed disclosure and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Inorganic material and membranes including the material in accordance with the invention can be formed from silicone polymers under basic conditions. The inorganic material can be layers of true continuous thin films of crystalline material and can also be films of interlocking crystals. The crystalline framework can be formed of a silicate containing trivalent or tetravalent heteroatoms other than silicon interspaced through the framework. In a preferred embodiment of the invention, inorganic membranes are synthesized from polysiloxanes such as polydialkyl siloxanes or polydiarylsiloxanes. The inorganic material formed can be placed in a suitable support and can be used to effect separations, to catalyze reactions and to otherwise change the composition of gas or liquid fluid contacting the membrane.

Inorganic membranes such as those including zeolitic material or other molecular sieve material in accordance with the invention can be stable over a broad temperature range, approaching and even exceeding 1000° C. and can be relatively inert to most materials. Inorganic materials, such as layers of zeolite formed in accordance with the invention can have channels and chambers having a pore size of from about 4 to 12 angstroms. The crystal structure can include ionic centers such as when aluminum is incorporated in the crystal framework of a zeolite structure. These centers can interact with molecules having quadruple moments. This provides a second mechanism for separation and can also act as a catalytic center. Accordingly, materials in accordance with the invention can act as catalysts.

In order to increase the probability that all of the input stream is exposed to the catalytic centers within the zeolite pores, thin film zeolite crystals or thin layers of integrated zeolite crystals can be mounted on a support and used as a membrane. By passing the input stream through such a membrane, all of the stream is exposed to the zeotype material.

Acceptable inorganic materials can be synthesized from silicone material, such as various substituted and unsubstituted polysiloxanes, especially polyalkyl siloxanes. Methods of accomplishing this are discussed in copending application Ser. No. 07/864,814, filed Mar. 31, 1992, the contents of which are incorporated herein by reference. Silicone polymers include long alternating silicon-oxygen chains with organic groups on the open positions of the silicon atoms. Silicone polymers can be prepared from dichlorosilanes or cyclic dialkyl or diaryl siloxanes. When exposed to basic solutions and high temperatures, (such as under conventional ZSM-5 growth conditions) silicone material can be converted into inorganic material. The polymer is attacked by the hydroxyl group to displace the alkyl groups from the silicon atoms and to break the polymer chains. The type of group attached to the silicon atoms affects the rate of carbon-silicon bond breaking. Phenyl and other aromatic groups have relatively slow rates of displacement, while allyl groups and α- and β-chloro alkanes have fast rates.

Inorganic material in accordance with the invention can be synthesized by using silicones such as polydialkyl (aryl) siloxanes as the only source of silicon. Straight chain and cyclic silicones can be used. Zeolite precursors with four or more silicon atoms can be used. Silicones have different water solubilities and can be dissolved in a solution for growing zeolites. A layer of silicone can also be disposed on a substrate and immersed in the solution.

A solution for growing zeolitic material from silicone generally contains a base and can also contain a source of aluminum and a structure directing template for directing the growth of the desired framework. Acceptable bases include NaOH and $NaHCO_3$; the source of aluminum can be $Al_2O_3$ or $NaAlO_2$; and the template can be tetrapropylammonium bromide (TPA-Br) for the ZSM-5 framework or sodium ions for the zeolite-Y framework. The silicone and basic solution are heated at about 90° C. to 300° C., or higher, preferably at 90° to 250° C. or 100° to 200° C. depending on the type of final product desired, for more than about four hours preferably more than 24 hours and up to several days, depending on how much material is desired. An acceptable inorganic membrane can be synthesized from polysiloxane material and a solution of about 1 to 2% NaOH and any of about 1 to 15% TPA-Br and 0.1 to 0.3% $NaAl_2$, heated at about 150° to 200° C.

The silicon source and base and optionally the aluminum source and template are heated at a temperature at which the desired zeolite framework is formed. The appropriate conditions for forming different types of zeolites from conventional starting materials such as $SiO_2$ are well known to those in the art. For example, to form a ZSM-5 framework, the solution or gel is heated at about 180° C. To form a zeolite-Y framework, the solution or gel is heated to about 100° C. Different zeolites are described in U.S. Pat. No. 5,019,263 at column 4, lines 8–24. Zeolite growth will generally take place during a period of from one to several days. If the conditions for forming a desired zeolite involve pressures above one atmosphere, the solution or gel can be heated in an autoclave.

The solution can be placed in a container with a Teflon surface and a layer of material will form on the Teflon surface. Inorganic layers can form on the surface of the container. Stainless steel or an other relatively inert surface is also acceptable. Teflon surfaces have an advantage that it is easier to remove the layer of inorganic material for use as a membrane without breakage. It can also be advantageous to grow a composite membrane on a porous surface and to leave the membrane in place so that the composite membrane will have greater strength. After the membrane is formed, it can be calcined at temperatures up to and exceeding 200° C. for about 1–50 hours.

If the silicone polymer is a solid and is insoluble in water, the silicone can be converted to a zeolite layer directly. Otherwise, it can be solubilized. In that case, the solubilized silicone will tend to be converted to a layer on the sides of the container or on the surface of the solution.

The type of product formed depends on the conditions of crystal growth. These conditions include the thickness of the polymer, the temperature and the reactants in the solution. Crystalline layers can be grown to thicknesses of up to 500 and even 2,000 microns. Crystal sizes of zeolitic crystals, for example can be about 1–150 microns and frequently over 30 microns in size. Crystal layer growth will be observed both on the side of the vessel and on the surface of the solution. Generally, both types of growth will be observed. The silicone can also be enclosed in a sealed bag formed from extra coarse Teflon membrane for example. Dissolved material can easily migrate through such a bag. The solution will be seen to penetrate the bag, dissolve the silicone and form a zeolite layer for use as a membrane outside of the bag.

Inorganic crystal layers formed in accordance with the invention can be formed in a true three dimensional structure in which tetrahedra of primarily $SiO_4$ are bonded to common oxygen atoms. By varying the starting materials and synthesis conditions, the manner of this bonding can be selected. The tetrahedra can form basic units by forming 4, 5, 6, 8, 10 or 12 membered rings of interconnecting tetrahedra. Double rings can also be formed. The manner by which the rings can be interconnected determines the framework.

Cavities will be present in the framework and the entrance of the cavity forms a structure of 6, 8, 10, 12 or larger member rings. The cavities will therefore have uniform diameter and can act as a molecular sieve for molecules of different sizes.

The silicones used in the inorganic membrane formation process can be formed with different functional groups, as desired, to obtain polymers and inorganic membranes having different desirable properties. For example, the water solubility of the silicone can be increased by adding polar side groups, such as carboxylic acid, to the silicon atoms.

Carboxylic acids are especially attractive because they will form salts in the basic solutions used to synthesize zeolite type membranes.

The rate of conversion of the organosilicones to inorganic material, such as for zeolite membranes, can also be controlled by incorporating different organic groups within the silicone material. Although methyl groups work well, if higher rates of conversion are required, better leaving groups, such as chloromethyl or allyl groups can be used instead. Those of skill in the art will also note that different groups will be most appropriate for growing zeolite membranes at different temperatures.

By incorporating different elements in the silicone polymer, it is possible to incorporate those elements into the inorganic membrane framework. For example, it is known how to bond elements such as aluminum, boron and titanium to silicon through oxygen bridges. These elements will then be incorporated into the silicone polymer chains and would be available for incorporation into the membrane framework.

The term "molecular sieve" includes a wide variety of positive ion containing crystalline material. The material is generally characterized as an aluminosilicate although other crystalline material is included by the term "molecular sieve". Zeolites are a type of molecular sieve. Conventional molecular sieve membranes are discussed in U.S. Pat. No. 4,268,420. Membranes containing molecular sieve material having the following general formula can be synthesized in accordance with the invention.

$$X_2O_3:(n)YO_2$$

wherein X is a trivalent element such as Al, B, Fe, Ga and combinations thereof; Y is a tetravalent element such as Si, Ge, Ti and combinations thereof; and n is an integer having a value of at least 2 and typically from about 20 to about 10,000.

Inorganic membranes in accordance with the invention can be identical in composition and framework to known zeolites, such as ZSM-5 having the MFI structure. Zeolites have come to be designated by letters of other convenient terms, as set forth in U.S. Pat. No. 5,019,263, the contents of which are incorporated herein by reference. The ratio of silicon to aluminum can also be varied. In fact silicalite, a commercially available molecular sieve zeolitic (zeotype) material sold by Union Carbide contains no detectable aluminum, yet has the same pore size and framework as ZSM-5. Other commercially available zeolitic types of material are described in Chemical Engineering Progress, February 1988, which is incorporated herein by reference.

The zeolitic membranes (layers) in accordance with the invention that are formed from silicone polymers as the silica source typically have superior physical properties, compared to zeolitic membranes synthesized from gels. The membranes formed from silicone polymers will exhibit greater cross-linking among the interlocking crystals. This is due in part to sharing of polymer chains among crystals. Furthermore, zeolite membranes formed from silicone polymers can be in the form of true continuous zeolite thin films.

Zeolite membranes in accordance with the invention can be used as catalysts as well as for separating materials by contacting fluid against the membrane. Examples of mixtures that can be separated with zeolite membranes include oxygen/nitrogen, nitrogen/methane, carbon dioxide/methane, hydrogen/carbon monoxide, ethanol/water, branched hydrocarbons/straight hydrocarbons, specific types of xylene isomers/other xylene isomers, concentrated biomolecules/fermentation liquors and for the purification of natural gas or flu stack effluents.

Zeolitic membranes can also be useful in electrochemical systems, as described by Rolison, D. R. *Chem. Rev.*, 90, 867 (1990), the contents of which are incorporated herein by reference. Composite membranes containing zeolites and pressed zeolite pellets have found application in both batteries and electrodes. However, a true continuous zeolite membrane thin film or a membrane of interlocking crystals would provide benefits and superior properties, compared to current zeolite membranes.

The zeolitic membranes formed in accordance with the invention could also be useful in catalytic systems. The aluminum centers in zeolites can serve as a catalytic site. The aluminum has a net negative charge and therefore must have an associated cation. If the cation is a hydrogen ion, then the zeolite is referred to as being in the acidic form. This acidic form has been found to be very valuable in catalytic cracking as well as other hydrocarbon conversions. These include dehydrogenation, the conversion of olefins and paraffins to aromatics, the conversion of alcohols and ethers to hydrocarbons, the alkylation of aromatics, the disproportionation of toluene and the isomerization of xylenes.

The cation can also be a metal ion, such as sodium. Zeolites containing metal ions can carry out base catalyzed reactions. For example, such zeolites can be used to catalyze dehydrohalogenation reactions at temperatures as low as 40° to 50° C.

Transition metal ions such as platinum can be incorporated into the zeolite in place of hydrogen or sodium, by carrying out an ion exchange reaction. The platinum ions can be reduced to the metal form and can provide platinum agglomerates in the pores and channels of the zeolite. These metal agglomerates can serve as catalytic centers for the oxidation or reduction of organic materials. In each of these applications, acid, base and noble metal catalysis, the zeolitic membranes in accordance with the invention present a promising alternative to current technologies that employ powdered zeolites in fluidized and fixed beds.

Zeolitic membranes are particularly well suited for conducting photochemical reactions. For example, when 7-dehydrocholesterol is photolyzed in zeolite-Y, a much higher percentage of pre-vitamin $D_3$ is obtained than when it is photolyzed in solution. Furthermore, high terminal selectivity can be obtained in the photochlorination of a long chain alkanes adsorbed on ZSM-5 zeolites. However, current technology using conventional fluidized beds provides inadequate photoefficiency. Even if fluidized bed efficiencies can be increased, it is still necessary to remove the product from the zeolite particles. However, by contacting a stream of reactant to a zeolite membrane illuminated with light of an appropriate wavelength impinging on the exterior surface of the membrane, the reaction will take place in the membrane and the product will exit the membrane without further processing. This will maximize the efficient use of light, control the exposure time per molecule and eliminate the need for extracting the product from the zeolite.

Zeolitic membranes in accordance with the invention could also be useful to separate the electrodes in a fuel cell. The membranes that are currently used are made of ionomers which are expensive and are limited to a maximum operating temperature of 80° C. A zeolite membrane plugged with carbon, such as by a cooking process would permit the migration of hydrogen ions, but prevent the passage of hydrogen and oxygen molecules. Such a membrane would have an operating temperature in the range of several hundred degrees. Zeolite membranes could also be valuable as components in the fuel cell electrodes.

To catalyze certain chemical reactions, it is necessary to have catalytic sites within the pore structure of the zeolite. Active sites can be included in the crystal structure by incorporating trivalent aluminum, or other similar ions into the framework of the zeolite. Because of the missing bond, there is a negative charge associated with the aluminum site. This requires the presence of a positive cation in the zeolite pore. If this cation is a hydrogen ion then it can catalyze reactions such as hydrocarbon cracking. When metal cations are in the channels then base catalyzed reactions, such as dehydrohalogenation reactions, can be carried out.

The Si:Al ratios differ for the different kinds of zeolites. For ZSM-5 zeolites they are in the range of 20 up to very large values. At values greater than 1000 the material can be considered to be a silicate and is referred to as silicalite if it has a MFI framework. Mordenite is generally in the range of 10 and X and Y zeolites are 5 or below.

Other trivalent atoms, such as boron and other Group 3A elements, iron (III) and other transition metal ions, can be used in place of aluminum to achieve the desired catalytic centers. Since these metallosilicates are technically not zeolites, zeolites, pure silicates, such as silicalite, and zeolite-like metallosilicates can be referred to as zeotype materials. All general comments herein with respect to zeolites are also applicable to the class of zeotype materials.

Tetravalent ions can also be incorporated into the framework. For example, titanium can be incorporated into the MFI framework. These titanium containing zeolites (zeotype materials) can have the ability to initiate photochemical reactions since $TiO_2$ is good photocatalyst. For efficient use of language, any atom in the framework other than silicon or oxygen will be referred to as a heteroatom.

The presence of aluminum centers in the framework of the membrane can also be of value in certain separations where the ions in the channels preferentially interact with one of the materials to be purified. For example, methane in natural gas mixtures can be contaminated with nitrogen making it unsalable. Because nitrogen has a quadrapole moment, it associates more strongly with the cations than with methane, which has no quadrapole. Purification of natural gas contaminated with nitrogen and/or carbon dioxide, which is also a quadrapole moment, would be very efficient using a zeolite membrane containing aluminum.

The fabrication of several membranes including zeolitic material having the MFI framework by methods different than those discussed herein has been reported recently by several groups. These reports typically discuss forming silicalite membranes, because the incorporation of aluminum and obtaining a membrane structure with conventional gel technology is difficult.

Sano (T. Sano, F. Mizukami, H. Takaya, T. Mouri and M. Watanabe *Bull Chem Soc. Jpn.*, 65 146 (1992), see also T. Sano, Y. Kiyozumi, M. Kawamura, F. Mizukami, H. Takaya, T. Mouri, W. Inaoka, Y. Toida, M. Wantanabe and K. Toyda, *Zeolites*, 11, 842 (1991) incorporated herein by reference) reported carrying out gel based growth of membranes in the presence of aluminum and presented a careful analysis of the results. Working in a more concentrated gel than reported by Haag, in U.S. Pat. Nos. 5,019,263 and 5,069,794, Sano reports being able to produce zeolite layers under certain conditions. He reported that the Si:Al ratio of the unreacted gel dropped from 100 to about 50 after 24 hours, showing that the silicon was being incorporated into the membrane twice as fast as the aluminum. He also observed significant inhomogeneity in the distribution. For example, at the point of initial growth the Si:Al ratio was high, about 200 to 1 to greater than 600 to 1. At the end of the growth this value dropped to as low as 20:1. In between, the values varied from 70:1 to 30:1.

The crystal morphology of the two sides of the zeolite layers is also very different. The side where the initial growth took place have well defined crystals of 10–20 $\mu$in size. The other side changes with reaction time. At short reaction times when the Si/Al ratio is still high the crystals are well defined. As the length of the growth cycle is increased the surface gets less and less defined until it looks like rolling hills. The surface is coated with what the author refers to as microcrystals, ZSM-5 zeolites with low crystallinity. He proposes the high Al portions of the film have a high concentrations of the microcrystals which are rich in Al. This would explain the low level of crystallinity, since the Si/Al ratio would be outside the optimum range for obtaining the MFI framework.

Sano's work demonstrates the difficulties of incorporating aluminum into the crystal framework using the gel growth approach to zeolite membrane growth. Not only does it make it more difficult to grow a membrane structure, but the aluminum is not evenly distributed. The bulk of the aluminum may well be incorporated in a semiamorphous material incorporated into the membrane structure.

These results also demonstrate the effect of the concentration of the gel on aluminum incorporation in the membrane. In the work of Sano where the $H_2O$ to Si ratio is 80:1 the aluminum is eventually forced to incorporate into the membrane as the growth progresses. It does not incorporate efficiently in the high silica membrane initially formed and so forms the Al rich microcrystals with low crystallinity. Haag describes a solution over three times more dilute than Sano's with $H_2O:SiO_2=283$. Under these conditions using an Si:Al ratio of 27 (vs 100 for Sano's work) the aluminum would simply stay in solution rather than being incorporate into the membrane.

Sakurada (Canadian Patent 1,235,684, incorporated by reference) discussed the possible incorporation of heteroatoms using his techniques, but presents no evidence that they were incorporated. He reports very little aluminum in his formulations, but a fair amount of boron, which is somewhat more difficult to incorporate into the framework because of its smaller size. The contents of this patent are incorporated herein by reference.

Anderson reports the incorporation of aluminum into zeolite layers. (M. W. Anderson, K. S. Pachis, J. Shi, S. W. Carr, J. Mater. Chem., 2, 255 (1992), incorporated by reference) describes the formation of an oriented layer of gmelinite crystals on polytetrafluoroethylene (PTFE) by using polymeric templates which form a monolayer on the PTFE surface. This was a very thin layer of polycrystalline petals "with little space between them" and no evaluation as a membrane were carried out. No analysis was reported to confirm the incorporation of aluminum which would be expected in the formation of a gmelinite framework.

A layer of sodium A zeolite was reportedly grown on stainless steel mesh (European patents 0 481 658 Al, 0 481 659 Al and 0 481 660 Al ). The inventors state that it is impossible to grow a defect free structure using this technique. In addition, A zeolites have a Si:Al ratio of 1, so the framework is no longer truly a silicate structure with trivalent ion flaws dispersed in the framework.

It is clear from these results that superior techniques are needed to incorporate trivalent metal ions into the silicate frameworks of zeolites, especially ZSM-5.

The crystalline framework of material in accordance with the invention can be made up of silicate containing trivalent or tetravalent heteroatoms other than silicon interspersed throughout the framework. The trivalent heteroatoms in the framework act as anionic centers which will have a cation associated with each of them. These centers can serve as catalysts for both acid and base catalyzed reactions, depending on what cation is associated with the center. Hydrogen ions give acid catalysis, while metal ions in the pores associated with the trivalent heteroatoms lead to basic catalysis. In addition these metal cations can interact with molecules having quadrapole moments, allowing for a mechanism of separation of these molecules from those without quadrapole moments.

Acceptable inorganic membranes can be synthesized from silicone material, such as various substituted and unsubstituted polysiloxanes. These compounds contain alternating silicon-oxygen chains with organic groups on the open positions of the silicon atoms. These silicones can be linear, crosslinked or cyclic in nature. In the presence of base, a structure determining (directing) template and trivalent cations at temperatures from 90° C. to 250° C. the silicones can be converted to zeotype membranes containing ionic sites in the framework.

A solution for growing zeolite membranes containing ionic sites in accordance with the invention contains a base. The base can be hydroxides, such as NaOH or KOH, carbonates or bicarbonates. In addition to serving as a base, the cations may play a role in directing the course of the reaction.

The solvent for the membrane growth reagents is generally water, but organic cosolvents, for example ethanol, can be used to change the solubility characteristics of the process.

A structure directing (determining) template material is required to obtain the desired framework structure. Metal ions, such as sodium ions, have been found to direct the formation of certain frameworks, but triakylamines and tetraalkylammonium ions are particularly valuable in this application. For example, the tetrapropylammonium ion directs the formation of ZSM-5, while the tetrabutylammonium ions directs the formation of ZSM-11. Tetraethylammonium ions can be used in the synthesis of mordenite frameworks. Other amines can be also be used. For example ethanolamine can be used in the synthesis of zeolite A. These ions can be incorporated into the solution as the halide salt or in the hydroxide form. In the latter case the compound can serve the dual purpose as both template and base. The tetraalkylammonium or the trialkylamines can serve an extra role in the membrane formation by facilitating the solubilization of the silicones.

Another important reagent in making zeotype membranes with ionic centers is the source of the tri and tetravalent heteroatoms to be incorporated into the framework. Aluminum, can be added to the reaction solution as $Al_2O_3$, $NaAlO_2$ or other aluminum oxide salts. Examples of other trivalent cations that could be incorporated in the form of salts, particularly oxide salts include other Group 3A elements such as boron, gallium, indium and thallium as well as transition metals such as iron, chromium and scandium. Tetravalent species, such as titanium could also be incorporated in this way.

The silicone is placed into the container which is generally made of PTFE. A substrate for the growth of the membrane is placed or suspended in the container and the solution containing the base, templating agent and trivalent cation is poured over the silicone and substrate. The container is sealed in a housing capable of sustaining high pressure. The whole is then heated without stirring at 90° to 250° C., preferably from 100° to 200° C., for more than four hours, preferably more than 24 hours.

The substrate can be polymer material, for example PTFE, metals such as stainless steel or ceramic materials. In the second and especially the third case the substrate could also serve as a source of heteroatoms. The substrate can be a solid sheet from which the membrane can be removed, a porous material which can serve as a support for a continuous membrane layer or a screen with larger holes that can act as a support for an array of membranes that grow in the holes.

The silicone source, base, template, and trivalent species are heated at a temperature at which the desired zeolite framework is formed. The appropriate conditions for forming different types of zeolites from conventional starting materials other than silicones, such as $SiO_2$, are well known to those in the art. For example, to form a MFI framework, the solution or gel is heated from 100° to 220° C. To form a Zeolite-Y framework the solution or gel is heated at about 90° to 110° C. Zeolite growth will generally take place during a period of from one to several days. If the known conditions for forming a desired zeolite involve pressures above one atmosphere the solution or gel can be heated in an autoclave.

The formation of the desired membrane takes place through dissolution of the silicone in water soluble pieces, probably oligomeric in nature. The structure of these pieces depends to a certain extent on the nature of the starting material. For example, a linear structure gives linear strands, while crosslinked materials may have branched strands. Evidence suggests that the intermediate structure can influence the facility to incorporate other ions. These water soluble pieces are then transported to the growth surface where conversion to the zeotype membrane layer is completed. The trivalent species could be incorporated while the silicone is in solution, or when the framework is being formed. To form the inorganic framework the methyl groups must be displaced by hydroxide group and the hydroxy substituted silicon atoms condense with the loss of water to give the desired silicate framework.

The films formed in accordance with the invention can be placed in an appropriate support and can effect separations and can catalyze chemical reactions. The membranes can be configured as flat sheets, honeycombs or tubes. Honeycomb cross-flow membranes and tube membranes can provide very high filtration and are easy to clean. The membranes can also be formed on metal frits or porous ceramic surfaces.

Aspects and embodiments of the invention will be explained in greater detail with reference to the following examples. These examples are presented for purposes of illustration only and are not intended to be construed in a limiting sense.

EXAMPLE 1

An inorganic membrane was formed from silicone as a starting material. Silastic 590, a silicone product, is a polydimethysiloxane and contains vinyl groups and finely divided $SiO_2$ powder filler. Silastic 590 is a filled 2-part formulation available from Dow Corning Company. By mixing and thermosetting the mixture, it is possible to form a cross-linked silicone film with very desirable properties for the use in the synthesis of zeolite films. It is flexible, yet strong and stable at 180° C.

Silastic 590 from Dow Corning was hardened according to the directions. Equal parts of part A and part B were mixed and a thin layer of the mixture was coated on a glass plate.

The plate was placed in an oven and heated at 180° C. until the polymer hardened. After the silicone polymer was permitted to cool, it was removed from the glass plate.

A less than 1 mm thick portion of the film (approximately 0.3 g) was placed in a Teflon lined vessel and covered with an aqueous solution (approximately 20 ml) containing an aluminum source (0.2% $NaAlO_2$), a base (1.4% NaOH) and a template (8.6% TPA-Br). All percentages recited in the Examples are on a weight basis. The film and solution were heated in an autoclave at 180° C. for three days. A thin film of inorganic material was formed. Portions of the thin film were washed with distilled water and examined under 500X magnification. Small balls having faceting at random angles were observed in the film. This evidences that the balls were interlocking crystals. The material was examined by X-ray diffraction and was found to include ZSM-5 zeolite and quartz which is assumed to have come from the filler.

The material was then tested to confirm the ZSM-5 structure. Hexane adsorption of the calcined zeolite gave 8% adsorption by weight. This was compared to Silicalite, which is a commercial high silicon material having substantially the same framework as ZSM-5. Silicalite exhibited 11% hexane adsorption. Accordingly, it was concluded that a ZSM-5 membrane had been formed from the Silastic 590.

EXAMPLE 2

Silastic 590 was cured according to directions and a 20×15×1 mm piece was sealed in a porous pouch formed of 5 micron Teflon membrane. The Teflon membrane was covered by the solution of Example 1 and heated at 180° in an autoclave for 4 days. On opening, the pouch was found to have a minor break that is assumed not to have affected the results. Some membrane growth had taken place on the Teflon side of the vessel holding the solution. However, most of the polymer in the bag had been converted to zeolite film in place.

EXAMPLE 3 (for comparison)

Finely divided $SiO_2$ powder available from the Aesar company, 30 Bond St. Ward Hill Massachusetts 01835 (approximately 15 g) was sealed in the Teflon bag of Example 2. The bag was covered with the solution from Example 2 and heated in an autoclave under the same conditions. The bag was found to be intact and full of solution. There was no film formed on the sides of the container and the solid inside the bag appeared identical to the starting Aesar $SiO_2$ when examined under a microscope. Accordingly, it was concluded that zeolite membranes cannot be formed under the conditions of Examples 1–3, using $SiO_2$ as the silicon source. However, zeolite membranes will form when silicone polymer is used as the source.

EXAMPLE 4

In order to include template material in the polymer material, Silastic 590 was cured at 75° C. with 8% tripropylamine. A portion similar in size to that of Example 2 of the cured Silastic 590 was covered with a solution containing 0.2% $NaAlO_2$ and 1.4 NaOH, but no TBA-Br. The silicone and solution were heated in a vessel for two days at 180° C. The solution was found to have an oily surface and a film was found at the bottom of the vessel as was some powder. Microscopic examination of the film showed that it was very similar in structure to the film formed in Example 1. Accordingly, it was concluded that the template can be incorporated into the cured polymer and need not be added in the solution.

EXAMPLE 5

Both parts of Silastic 590 are not needed to form the inorganic membranes. Part B only of Silastic 590, a viscus liquid, was coated onto a Teflon plate. The plate was approximately circular in shape and 15–20mm in diameter. The coating was about 1 mm thick. The coated plate was covered with a solution containing 1.4% NaOH and 8.6% TBA-Br in a Teflon lined vessel. The container was heated at 180° C. for two days. Some material was formed on the bottom of the vessel. There was also a film of material formed on the Teflon plate. Microscopic examination of that material showed that it was a film having integrated highly faceted crystals and was concluded to be silicalite. Accordingly, part B of uncured Silastic 590 can be converted to an inorganic membrane.

EXAMPLE 6

Inorganic membranes can also be formed from unfilled silicone polymer. Sylgard® 184 was prepared and cured at 75° C. Sylgard 184 is an unfilled silicone polymer available from the Dow Corning Company. A 0.6745 gram piece of the cured polymer was placed in a Teflon lined vessel containing about 20 ml of an aqueous solution including 1.4% NaOH and 8.6% TBA-Br. The vessel was heated at 180° C. for six days. A silicalite film had formed over the bottom and sides of the container and had formed a dome over the top of the solution. The side of the membrane towards the container was a poorly defined bumpy surface. The side of the membrane towards the solution showed a well defined grid of interlocking crystals having a ZSM-5 type framework.

EXAMPLE 7

Uncured Sylgard 184 was coated on a Teflon plate and covered with solution as in Example 6. The polymer and solution were heated for six days at 180° C. and a thin zeolite membrane was found to have formed on the Teflon plate. The film showed a well defined network of crystals on both sides. The side closest to the Teflon exhibited much smaller crystals than did the side facing the solution.

EXAMPLE 8

A 0.6 gram sample of Sylgard 184 was treated as in Example 6 and was heated for five days at 180° C. A film having well defined interlocking crystals was formed. The film was ground and examined by X-ray diffraction. The results showed that the sample was approximately 100% silicalite. The ground-up membrane adsorbed 11% hexane by weight, the same amount adsorbed by commercial silicalite. The membrane was examined by atomic absorption analysis which showed that the amount of aluminum present was below the detection limits of the instrument, less than 1 mg of Al to 233 mg of silicon.

EXAMPLE 9

A zeolite membrane was prepared as in Example 8, except that 0.2% $NaAlO_2$ as an aluminum source was added to the solution. The ground membrane had an X-ray diffraction pattern essentially identical to that obtained from Example 8. Atomic absorption analysis showed 1.39 mg of aluminum per 386 mg of silicon. Accordingly, it was possible to incorporate aluminum from solution into the crystal network and form a zeolite membrane.

EXAMPLE 10

The procedures of Example 10 were substantially the same as those of Example 8. However, a transparent film was formed that did not show any observable crystalline structure. The membrane was ground and shown to contain silicalite together with amorphous silica. Accordingly, it was concluded that a true continuous zeolite membrane thin film had been formed.

EXAMPLE 11

To solubilize cross-linked silicone polymer, 0.62 grams of Sylgard 184 was dissolved in 19.66 grams of $D_2O$ containing 0.90 grams of 40% NaOD in $D_2O$. The solution was heated at 180° C. for five days and then filtered. A $^1H$ NMR of the filtrate was taken and the presence of Si-$CH_3$ from the silicone polymer was observed. Accordingly, it was concluded that the cross-linked silicone polymer was solubilized in the basic solution.

EXAMPLE 12

Sylgard 184 was treated with NaOD/TPA-Br/$D_2O$ solution heated to 180° C. for 1½ days. The reaction product was filtered and $^1H$ NMR show the presence of silicone polymer metals. Accordingly, the presence of TPA-Br in solution does not prevent solubilization of the silicone polymer.

EXAMPLE 13

An inorganic membrane was formed from pure polydimethyl siloxane. Polydimethyl siloxane was prepared by adding dimethyldichlorosilane to a sodium hydroxide solution and stirring the solution until silicone polymer material collected as a viscous oily material at the top of the solution. The oily silicone polymer material was separated from the solution.

0.61 grams of collected silicone material was added to a NaOH/TPA-Br solution having approximately the same composition as in Example 6. The polymer and solution were heated in an autoclave at 180° C. for 7 days. On opening the autoclave, a very high quality zeolite thin film membrane was found at the bottom of the container. Membrane films were also formed on the sides of the container and over the top of the solution. The membrane film was semitransparent and was formed of interlocking crystals having a diameter of approximately 10 to 40 microns. The mass of the films collected was 0.20 grams. No individual crystals or crystal agglomerates were found in the autoclave. Accordingly, it was concluded that high quality inorganic membranes could be formed from pure polydimethylsiloxane.

EXAMPLE 14

An inorganic membrane film was formed from a cyclic silicone. 0.66 grams of decamethylcyclopentasiloxane was reacted with an NaOH/TPA-Br solution as in Example 13. 0.03 grams of zeolite film was collected. The film was thinner than in Example 13 and was formed from larger interlocking crystals, having a diameter of approximately 30 to 100 microns. It was concluded that cyclic siloxanes are converted to zeolites more slowly than are linear siloxanes. It was also concluded that the structure of the silicone material has an affect on the structure of the membrane.

EXAMPLE 14

0.65 grams of decamethyltetrasiloxane was reacted with NaOH/TPA-Br solution, as in Example 14. A small amount of zeolite film was recovered, together with agglomerates of zeolite crystals having a diameter of about 150 microns. The total mass of zeolite material collected was 0.11 grams.

EXAMPLE 16

A chlorination reaction was carried out by combining a hydrocarbon and chlorine gas in a membrane formed in accordance with the invention, in the presence of light. An inorganic membrane was prepared as set forth in Example 13. 0.88g of polydimethylsiloxane was converted to an inorganic membrane and the membrane was calcined at 650° C. for 90 minutes. The membrane weighed 54.1 mg and three ml of dichloromethane solution containing 3.3 mg of n-dodecane was poured over the membrane. The solvent was removed under a stream of nitrogen and the membrane was allowed to sit until it reached a constant weight of 57.9 mg. The loaded membrane was then placed into a beaker which was purged with nitrogen. The beaker was covered and 2.6 ml of chlorine gas was added. The beaker was then irradiated for 20 minutes with a Black-Ray model B-100A lamp which has a maximum at 365 nm. The membrane was extracted with dichloromethane for thirty minutes. The dichloromethane was then removed under a stream of nitrogen and hexane was added.

It was determined by a gas chromatographic analysis that 28% of the dodecane had been converted to chlorinated hydrocarbon. The selectivity data obtained agreed with values reported for silicalite in U.S. Pat. No. 4,971,664, Examples 104 and 110. The terminal selectivity ($S_O$) was 1.2 (36% of the monochlorinated product was 1-chlorododecane ($S_T$)) versus 0.3 to 0.4 which is common for solution photochemistry ($S_T$=10–12%). The percentage of monochlorinated product in the product mixture ($S_MO$) was 84%.

Accordingly, it was demonstrated that membranes in accordance with the invention are useful for carrying out regiocontrolled reactions. Chlorine can be mixed with hydrocarbon and the mixture can be passed through an illuminated membrane. This will lead to better control of stoichiometric ratios of reagents compared with many conventional fluidized bed systems.

EXAMPLE 17 (For Comparison)

This example is an attempt to incorporate aluminum using the gel-type formulation techniques discussed in U.S. Pat. Nos. 5,019,263 and 5,069,794. The molar composition of the gel was 100 $SiO_2$: 3.7 Al(OH)$_3$ : 4.5 NaOH: 2832 $H_2O$: 5.22 TPABr. Stainless steel screen (#50-1-0 from Buckbee-Mears, 0.005" thick and 0.011" diameter cylindrical hole size) was used as a membrane support. The mixture was heated in an autoclave for two weeks. The membrane was removed from the screen support and analyzed by elemental analysis. It was found that Si:Al ratio was 354 as compared to gel Si/Al ratio of 27. The result indicated that aluminum was not incorporated into a zeolite membrane using the teachings in these patents.

EXAMPLE 18, 19 AND 20

The general procedure for growth of ZSM-5 zeolite membranes containing aluminum was to weigh out approximately 0.8 g of Sylgard®, part B (Dow-Corning) into a 23 mL Teflon cup (Parr). Into the cup was suspended a thin sheet of stainless steel screen (#6-4-4 Buckbee-Mears). A solution containing sodium hydroxide (Aldrich), Tetrapropylammonium bromide (Aldrich) and water in a mole ratio of 1:1:150 respectively was added. Adequate sodium aluminate (EM Science) was dissolved in 12–13 mL of solution to give the desired Si/Al ratio in the starting materials. The solution was poured gently over the silicone to disturb it as little as possible. The cup was then sealed in a stainless housing and put in a 180° oven for 7 days. If the desired membrane was not completely formed the process was repeated using the partially coated stainless steel. Following membrane formation the membranes were washed in distilled water and calcined for 8 hours at 500° C. The specific conditions for each example are given in Table 1.

TABLE 1

| | Reaction Conditions | |
|---|---|---|
| Example | Si:Al | No. of Runs |
| 18 | 28 | 3 |
| 19 | 89 | 3 |
| 20 | 31 | 2 |

Figure 1:
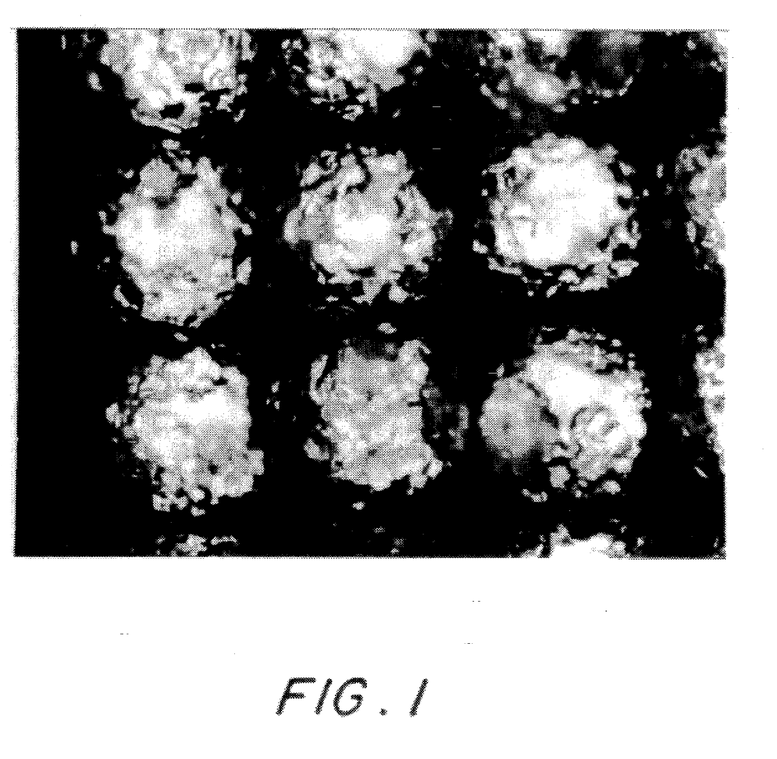
FIG. 1 is a photograph showing a 100× enlargement of an array of interlocking zeotype crystal membranes formed across the smooth bore perforations of a metal screen.

The membranes produced had well defined interlocking crystals across the holes in the screen as shown photographically in FIG. 1. No evidence of poorly defined crystals or microcrystals were observed in the membranes.

EXAMPLES 21–24

The samples prepared in Examples 18–20 were subjected to atomic absorption analysis. The results are given in Table 2. The sample from Example 18 was analyzed twice. The second time it was sonicated in distilled water three times for one hour intervals before analysis.

TABLE 2

| | Reaction Conditions | | | |
|---|---|---|---|---|
| Example | Sample | % of Si | % of Al | Si:Al |
| 21 | 18 | 37.12 | 2.89 | 12.4 |
| 22 | 18 washed | 41.42 | 3.06 | 13.0 |
| 23 | 19 | 43.13 | 0.39 | 107 |
| 24 | 20 | 36.65 | 1.41 | 25 |

Examples 22 and 23 demonstrate that the aluminum could not be removed by intensive washing. This suggests that the bulk of the aluminum was incorporated into the framework.

EXAMPLE 25

This example demonstrates that the aluminum is incorporated into the MFI framework of the membrane. The membrane made in Example 20 was removed from the screen and was ground into a powder. A $^{27}Al$ NMR of this powder was determined using magic angle spinning techniques. The results are provided in FIG. 2.

Figure 2:
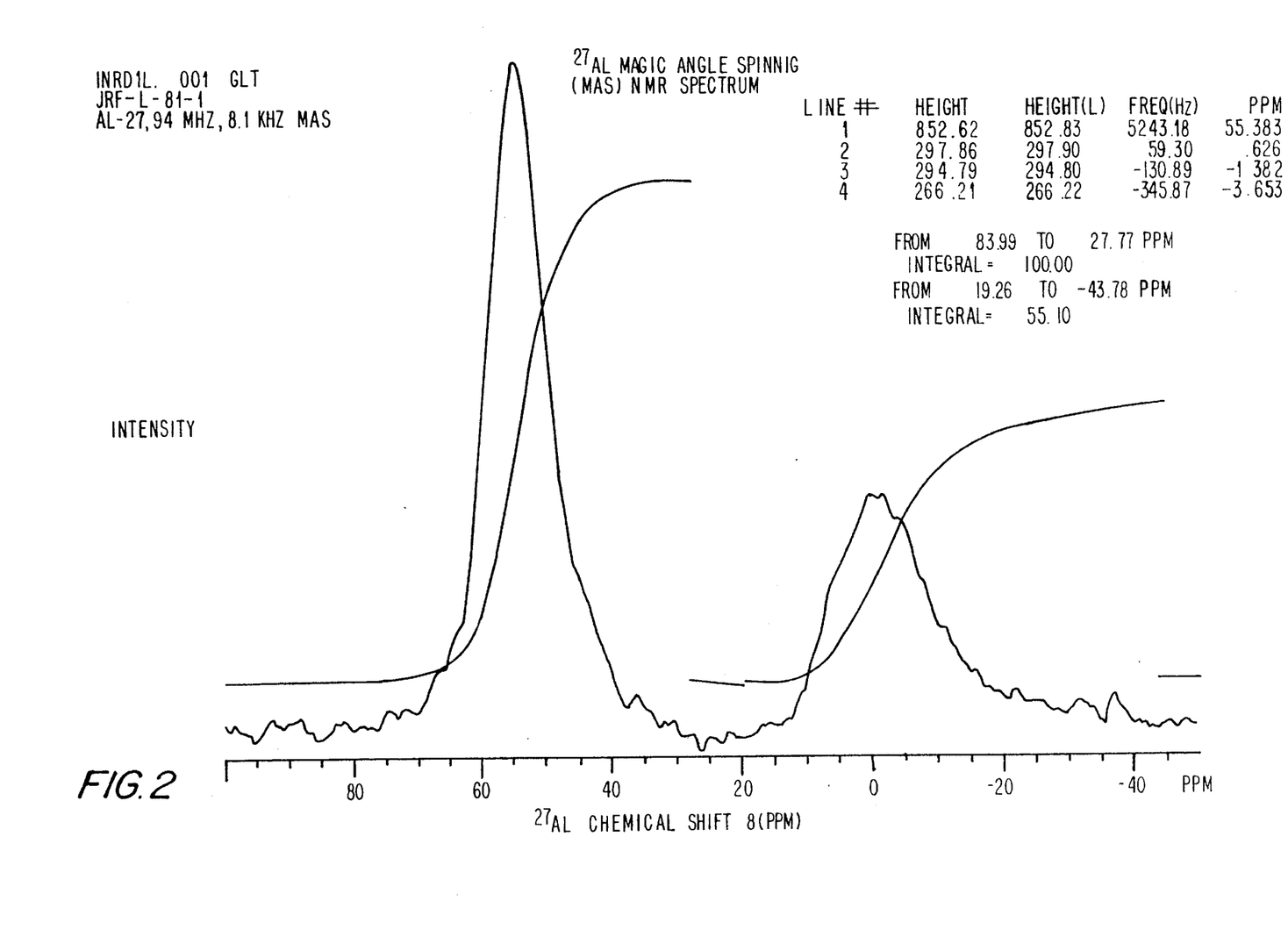
FIG. 2 is a $^{27}Al$ NMR of a membrane layer formed in accordance with the invention.

The spectrum had two peaks, a sharp one at $\delta 55$ ppm due to framework Al and a broad peak centered at $\delta 0.6$ ppm due to non-framework Al. These were in a ratio of 100:55, or 65% framework Al. The raw Si:Al ratio was 25:1. Back calculating thus leads to a Si:Al ratio for framework Al only of 38:1.

EXAMPLE 26

Sylgard®184, Part B (0.7998 g) was weighed into a PTFE cup and a 6-4-4 screen was suspended over it. 0.0220 g of boric acid was added to 14 mL of a solution containing 0.7266 g of NaOH, 48 mL of $H_2O$ and 4.8420 g of TPA-Br (Aldrich, recrystallized from ethanol). This solution was poured gently over the silicone. The cup was put in a housing and heated at 180° C. for eight days. The screen had a uniform layer of zeolite over it. The crystal structure was much different than that for the silicalite membranes. The crystals were smaller and had a layered structure. The membrane was rinsed with distilled water, calcined and analyzed. The resultant Si:B ratio was 38:1.

It will thus be seen that the objects set forth above, among those made apparent from the preceding description, are efficiently attained and, since certain changes may be made in carrying out the above process and in the composition set forth without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A method of forming a layer of zeotype material comprising the steps of combining silicone material with a basic solution, a structure directing template material and a source of heteroatom, reacting the combination with heat at a temperature from 90° C. to 300° C. for more than 4 hours and forming a layer of crystalline zeotype material including the heteroatom in the crystalline framework.

2. The method in claim 1 wherein the base is a metal hydroxide.

3. The method in claim 1 wherein the base is NaOH.

4. The method in claim 1, wherein the base is a carbonate.

5. The method in claim 1, wherein the base is an ammonium hydroxide.

6. The method in claim 5, wherein the ammonium hydroxide is a tetraalkylammonium hydroxide.

7. The method in claim 6, wherein the tetraalkylammonium hydroxide is tetrapropyammonium hydroxide.

8. The method in claim 1, wherein the template material is sodium ions.

9. The method in claim 1, wherein the template material is a tetraalkylammonium ion.

10. The method in claim 9, wherein the tetraalkylammonium ion is tetrapropylammonium ion.

11. The method in claim 1, wherein the template material is a trialkylamine.

12. The method in claim 1, wherein the template material is tripropyl amine.

13. The method in claim 1, wherein the silicone is a polydialkysiloxane.

14. The method in claim 1, wherein the silicone is polydimethylsiloxane.

15. The method in claim 1, wherein the silicone is Sylgard® 184, Part B.

16. The method of claim 1, wherein the silicone is crosslinked.

17. The method of claim 1, wherein the silicone is cured Sylgard® 184.

18. The method in claim 1, wherein the solvent is water.

19. The method in claim 1, wherein the solvent is a mixture of water and an organic solvent.

20. The method in claim 1, wherein the heteroatom is a trivalent element.

21. The method in claim 1, wherein the heteroatom is a group 3A element.

22. The method of claim 1, wherein the heteroatom is aluminum.

23. The method in claim 1, wherein the heteroatom is a transition metal element.

24. The method in claim 1, wherein the heteroatom is a tetravalent element.

25. The method in claim 24, wherein the heteroatom is a tetravalent transition metal element.

26. The method in claim 1, wherein the reaction mixture is heated to a temperature from about 90° to 250° C.

27. The method in claim 1, wherein the reactants are heated for more than one day.

28. The method in claim 1, wherein the layer is grown on a sheet by dipping a sheet into the solution while the components are reacting.

29. The method in claim 28, wherein the sheet is made from polytetrafluoroethylene.

30. The method of claim 28, wherein the sheet is made from metal.

31. The method in claim 28, wherein the sheet is made from ceramics.

32. The method in claim 28, wherein the sheet is porous.

33. The method in claim 28, wherein the sheet is a screen having openings therethrough.

34. The method in claim 33, wherein the sides of the screen defining the openings are smooth.

35. The method of claim 1, including adding a source of aluminum to the solution.

36. The method of claim 1, including adding an aluminum oxide salt to the solution.

37. The method of claim 1, wherein the layer is mounted on a support for permitting fluids to pass therethrough.

38. The method of claim 1, wherein the layer of inorganic material is formed on a Teflon substrate and removed therefrom.

39. The method of claim 1, wherein the molecular sieve material has the general formula:

$$X_2O_3:(n)YO_2$$

wherein X is a trivalent element selected from the group consisting of aluminum, boron, iron and gallium and combinations thereof; Y is a tetravalent element selected from the group consisting of silicon, germanium, titanium, and combinations thereof; and n is at least 2.

40. The method of claim 1, wherein the solution is heated with tetrapropylammonium bromide (TPA-Br).

41. The method of claim 1, wherein the solution includes about 0.1 to 0.3% $NaAlO_2$.

42. The method of claim 1, wherein a polydimethylsiloxane is combined with a basic solution containing about 1 to 2% NaOH and about 1 to 10% TPA-Br.

43. The method of claim 1, wherein the silicone polymer is cross-linked in three dimensions.

44. The method of claim 1, wherein the silicone material includes a side group selected from the group consisting of alcohol groups, carboxylic acid groups, sulfonic acids groups, halogenated groups, aromatic groups and groups containing double bonds.

45. The method of claim 1, wherein the template is selected from the group consisting of organic amines and amine salts.

46. The method of claim 1, wherein reaction conditions are controlled to provide zeolitic material in the form of interlocking crystals having a crystal diameter of from about 10 to 150 microns.

47. The method of claim 1, wherein conditions are controlled to provide zeolitic material in the form of interlocking crystals having a thickness of from 500 to 2000 microns.

48. The method of claim 1, wherein reaction conditions are controlled to provide zeolitic material in the form of a continuous zeolite thin film.

* * * * *